Oct. 14, 1958     O. L. BEBER ET AL     2,856,273

APPARATUS FOR LOW VELOCITY FLUIDIZATION

Filed Dec. 28, 1953

INVENTORS.
ORAL L. BEBER
KENNETH M. WATSON
BY BYRON B. WOERTZ

*Edward N Fang*

ATTORNEY.

United States Patent Office 2,856,273
Patented Oct. 14, 1958

2,856,273

APPARATUS FOR LOW VELOCITY FLUIDIZATION

Oral L. Beber, Crystal Lake, Kenneth M. Watson, Lake Zurich, and Byron B. Woertz, Crystal Lake, Ill., assignors to The Pure Oil Company, Chicago, Ill., a corporation of Ohio Application December 28, 1953, Serial No. 400,542

2 Claims. (Cl. 23—288)

The present invention relates to apparatus for conducting the contact of gases or vapors with solid contact materials under fluidizing conditions and relates more particularly to the use of agitation at or immediately above the contact material support to attain good fluidization, maximum bed expansion, minimum fines loss, and reduction in channelling at relatively low linear flow velocities.

It is known to employ various combinations of impellers, blowers, orifices, and the like which are designed to mix finely divided fluidizable contact materials with swiftly flowing gaseous or vapor reactant streams to accomplish fluidization. It is advantageous for many purposes to employ high mass velocities for easy and uniform fluidization. The primary object of previously known methods and devices is to contact large volumes of gaseous substances or vapor phase reactants with relatively large volumes of contact material under suitable conditions and relatively high flow velocities, that is, in the order of 0.5 to 100 feet per second. Examples of reactions commonly conducted under these conditions are cracking, hydrogenation, reforming of naphthas, hydrodesulfurization, and the like. Throughout the description, the term "contact material" is intended to mean any fluidizable solid material, whether catalytic or not. By the term "gases" is meant those fluid materials which are naturally in the gaseous state and vaporized fluids or reactants and mixtures to be treated under fluidized conditions. And the term "reactants" shall include gases or mixtures of gases or vapors intended to enter into a reaction as well as individual fluids to be treated. A "contactor" shall include a reactor.

There are many contacting or reaction systems which are facilitated by an environment of low mass velocity and, therefore, lower linear velocity. Such systems include those in which a mechanically fragile or expensive contact material is employed and it is desired to reduce attrition to a minimum or in which a succession of contacting steps is desirable in order to insure progressive movement of the gases or reactants throughout the entire fluid zone without "back mixing" of the products with the reactants along the direction of flow. Such progressive contacting is particularly advantageous where undesirable secondary reactions or conditions occur. Progressive contacting may be achieved by passing the reactants successively through a plurality of fluidized beds, each of which is on an individual support and separated from the next by a disengaging space. Means may be provided for controlled movement of contact material from one bed to the next, either in counter or concurrent flow with respect to the reactants. The design and operation of such multiple bed contactors are facilitated by any means of maintaining good fluidization at a low velocity which will minimize attrition and contact material entrainment in the reactant stream. When it is attempted to maintain fluidization at low linear flow velocities below 0.4 foot per second, difficulties are encountered in conventional contactors, particularly where a large ratio of bed depth to diameter is required. Zones of quiescence form within the fluidization zone, with resultant poor bed expansion, and channelling throughout the fluidization zone. In extreme cases, different sized particles of contact material are segregated in local zones of the bed with the result that all fluidization will cease and the flow of the reactants will continue through fixed channels in a rigid bed.

It has long been desired to attain uniform fluidization of a contact material bed and at the same time attain progressive reaction or contact conditions throughout the fluidization zone. One method already referred to comprises dividing the bed into separate zones through which the reactants pass successively. However, it is frequently desirable to approach a similar result in a single bed. Prior art methods and apparatus using high flow velocities and high mass velocities with indiscriminate mixing and agitation approach homogeneous conditions in which the products are present throughout the bed in approximately the concentration existing at the outlet. In many cases, this results in loss of products by secondary reactions, resultant poor yields and product qualities.

Experience has taught that stationary baffle plates within a fluidization zone are of questionable benefit in producing a progressive contacting within a single bed which is fluidized at high velocity. However, at low velocities, with a high ratio of bed depth to diameter a reasonable approach to true progressive contacting may be achieved without serious sacrifice of the mobility of the contact material, the good heat transfer conditions, and the possibility of precise temperature control, which are advantages inherent to fluidized beds. However, these conditions which are conducive to progressive contacting are the same ones which promote channeling and loss of fluidization which may result in formation of a rigid bed through which fixed channels exist. Once such a rigid bed is formed, it remains stable for an indefinite period unless subjected to major changes in conditions or forces.

The degree of fluidization obtainable in a given environment is dependent upon many factors, some of which are subject to control and others which are inherent for a given contactor shape. The velocities in themselves that may be necessary to maintain adequate fluidization depend upon the inherent characteristics of the contactor, the particulate character of the contact material, the particle size range of the contact material, the ratio of the density of the contact material to the average density of the reactants, the surface characteristics of the contact material, superficial linear velociy, and viscosity of fluidizing fluid. Since as the linear flow velocity approaches zero the accumulative effect of the conditions adverse to fluidization becomes more pronounced, it came as a surprise to find that the judicious application and placement of agitation only adjacent to or in the vicinity of the contact material support, or of a dispersing means below and outside of the fluidization zone, made possible the elimination of the enumerated difficulties and the maintenance of good fluidization conditions, conditions of low linear velocity, and low mass velocity. Many attempts have been made to avoid channelling and insure good fluidization at low velocities with high ratios of depth to diameter by introducing various rotating or vibrating devices within or throughout the length of the fluidized bed of the catalyst to supply energy to break up classified segregation of particles and destroy rigid portions of the bed as they form. Such devices are undesirable because of their complexity, susceptibility to erosion by the catalyst, interference with flow of the reactants and products, interference with heat transfer and temperature control and the catalyst attrition they produce. It was found that such prior art vibrating devices placed within the bed are unnecessary if the principles of this invention are followed and mechanical energy is introduced by vibration, stirring, or dispersion, at or immediately adjacent to the contact material support.

In undertaking to design and test a sample contactor, it was found that satisfactory fluidization at superficial low linear flow velocities in the order of below about 0.4 to 0.05 foot per second or less could be obtained through the use of a columnar fluidization chamber fitted with means for agitation in juxtaposition with means for supporting the contact material and also serving as means for dispersing the reactants into the contact material. Experiments leading up to the present invention indicated that in a particular system as the linear flow velocity employed falls below 0.4 foot per second, the stability, uniformity, and fluidized qualities of the fluid bed begin to deteriorate and zones of fines settling, channelling, and the like are detectable. To overcome these difficulties, it was found that agitation in the form of vibration, centripetal force, or intimate dispersion only at the locus of initial mixing of gas and fluidizable contact material is necessary.

Accordingly, it is the primary object of this invention to provide a method and apparatus for conducting fluidized contacting processes under conditions of relatively low superficial flow velocities without the introduction of agitating or stirring devices in the gross volume of the contact material bed.

A second object of this invention is to provide a method of producing fluidized reactant-catalyst mixtures under conditions of low flow velocities in the order of 0.4 to 0.05 foot per second or less.

A third object of this invention is to provide a method of producing fluidized mixtures through a series of related steps including the judicious application of mechanical agitation.

Another object of this invention is to provide an apparatus including agitation means in juxtaposition with contact material support or reactant dispersing means whereby these combined structural features result in proper fluidization and good bed expansion under low velocity conditions.

It is a further object of this invention to provide a method for obtaining good fluidization of finely divided contact materials under flow velocities below those normally required for good fluidization.

A further object is to provide a method and apparatus to produce pronounced bed expansion with minimum fines loss during low velocity fluidization conditions under low mass velocities and with progressive contact conditions.

Other objects and advantages of the invention will become apparent or be inherent in the description hereof.

Throughout the specification the term support will be used to describe any form of perforated member adapted to support the catalyst materials and allow the flow of fluids therethrough. Such support may take the form of a screen, porous ceramic material, macadamized pebbles or balls, a perforated plate or baffle, or a foraminous support including porous stainless steel plates which are fabricated to any desired degree of porosity or perforation depending upon the particle size of the contact material to be used therewith. As the description proceeds, the preferred forms of each will be pointed out. The component parts of the apparatus in contact with the reactants or vapors undergoing physical change are understood to be constructed of materials which are resistant thereto.

Figure 1:
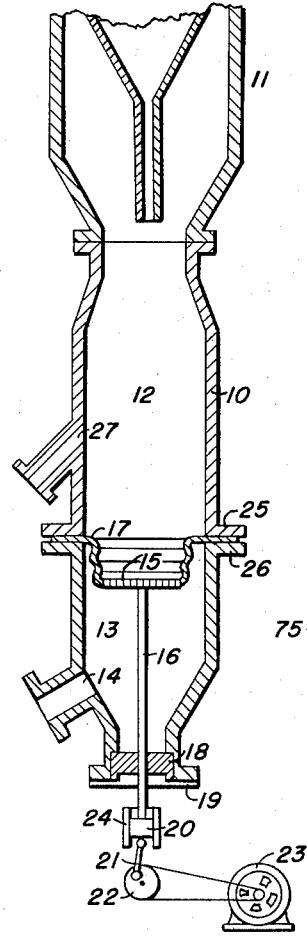
Figure 1 is a cross-secisional view of a contactor employing one embodiment of the present invention, a vertically oscillating catalyst support.

Referring to the drawings, it is seen that various arrangements of vibrating, oscillating supports, porous plates, or screens may be used in accordance with this invention. In Figure 1, a general view of the contacting apparatus 10 is shown having upper contact material separating zone 11 equipped with a cyclone separator or other means for removing entrained contact material from the products, fluidization zone 12, and zone 13 for entry of gaseous or vapor phase reactants at inlet 14. Separating zone 13 from zone 12 is a foraminous support or plate 15, which is attached to shaft 16 and sealed to the side walls of the contactor by means of flexible bellows 17. Shaft 16 passes through resilient seal 18 held by bearing member 19 and connects to slide member 20. Slide member 20 is connected by a wrist-pin arrangement to connecting rod 21, the other end of which is attached at an off-center point to wheel 22 rotated by motor 23. Guide member 24 maintains slide member 20 and shaft 16 in straight-line vertical movement. The mechanical arrangement gives plate 15 a vertical vibrating movement, the frequency of which is adjustable according to the speed of rotation of wheel 22 and the amplitude of which is adjustable according to the point from center at which connecting rod 21 is affixed to wheel 22. Bellows 17 serves as a connecting seal between the outer periphery of plate 15 and the inside wall of the contactor 10. There are several types of flexible bellows made of steel or other materials which are suitable for this purpose. Bellows 17 may be held within contactor 10 by any means including the flange arrangement shown at 25 and 26. The necessary bolts to hold the flanges and bearing members together have been omitted for simplicity. A port or conduit for removal of the contact material either continuously or intermittently is shown at 27.

Figure 2:
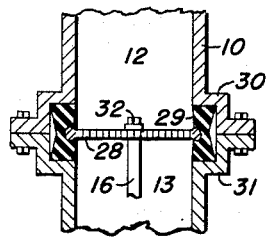
Figure 2 is a partial view in cross-section showing another arrangement of vibrating support at the bottom of a contacting zone.

In Figure 2, another arrangement of holding a catalyst support member 28 within contactor 10 is shown. Here the vibrating support is held by its periphery within resilient member 29 which is secured within the recess formed by opposing flanges 30 and 31. In this embodiment the support 28 may be a screen, foraminous material or a stainless steel plate. Shaft 16 is affixed to support 28 by means of nut 32. Corresponding component parts of the apparatus are designated by the numbers shown in Figure 1.

Figure 3:
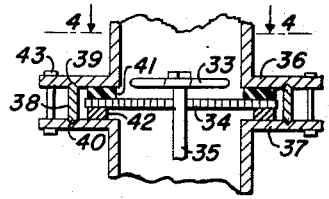
Figure 3 is a vertical section of a portion of the contactor showing an arrangement of stationary dispersing or support means and a rotating impeller.

In Figure 3, a simplified version of one embodiment of the invention is shown with an impeller 33 in juxtaposition to a stationary contact material support 34 and attached to rotatable shaft 35. The principal seal between the opposing flanges 36 and 37 of the reactor body comprises steel ring 38 which impinges between grooves 39 and 40 on the opposing faces of the flanges. Support 34 is sealed by means of gaskets 41 and 42.

Figure 4:
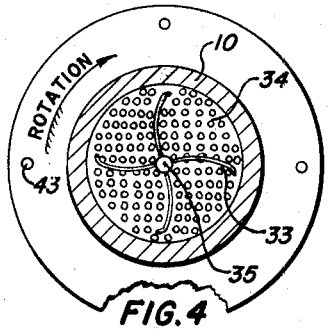
Figure 4 is a horizontal cross-section taken along lines 4—4 of Figure 3.

In Figure 4, a horizontal view taken along lines 4—4 of Figure 3, can be seen the general shape of the impeller 33 whereby its blades exert an inward or centripetal motion to the contact particles immediately above the support 34 so that they are propelled toward the center of the fluidization zone. The direction of rotation is shown by the arrow. The flanges are secured by bolts similar to 43.

Figure 5:
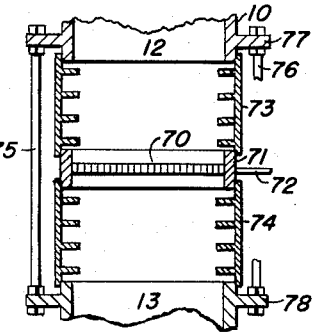
Figure 5 is a plan view of one form of impeller.

Another form of impeller with accentuated inwardly inclined tips 44 to insure the impartation of centripetal force to the contact material is shown in Figure 5. Each blade 45 is welded or otherwise attached to the hub 46 so that the surface of contact of the blade and hub with the contact material is a smooth continuous curve leaving no corners to catch contact material particles.

Figure 6:
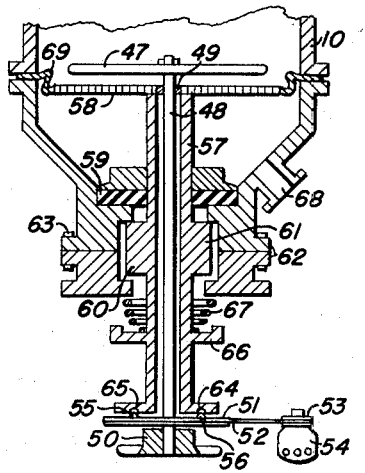
Figure 6 shows an arrangement whereby rotation is imparted to the impeller and vibration applied to the contact material support in juxtaposition therewith.

Figure 6 represents in detail an arrangement whereby one source of motive power can be utilized to simultaneously exert rotation to an impeller and vibration to a contact material support member. In this embodiment, impeller 47 or its equivalent is mounted on shaft 48 journaled in bearings 49 and 50. At one end of shaft 48 is affixed wheel 51 and the entire arrangement rotated by means of belt 52, pulley 53, and motor 54. The upper face of wheel 51 has circumferentially located raised portions 55 and 56. Encompassing shaft 48 is tubular member 57 affixed at its top end to contact material support member 58. Tubular member 57 is sealed to the wall of contactor 10 by means of seal 59. Below seal 59, tubular member 57 carries protruding spaced shoulders 60 and 61 which fit in sliding but non-rotating relationship within housing 62. Housing 62 is constructed in separable units for easy repair and removal of parts. Bolts 63 hold the housing in place. Tubular member 57 terminates at its lower end in flange 64, having on the underside thereof recesses 65 which engage raised portions 55 and 56 of wheel 51. On tubular member 57 is shoulder 66 retaining spring 67 against the bottom edge of housing 62 in such a manner that flange 64 is maintained against wheel 51. Thus, as wheel 51 is rotated, raised portions 55 and 56 will engage the recesses 65 of flange 64 successively or simultaneously, depending on their relative placement with each other to raise the tubular member 57 and thereby impart vibratory motion to catalyst support 58. The amplitude of such vibration can be varied by having various sized recesses or raised portions or both on the flange 64 or wheel 51. Likewise, the frequency of vibration may be varied by changes in speed of rotation of wheel 51 or by placement of the recesses and raised portions at correspondingly lesser or greater distances from the common center. One raised portion may be machined to protrude from the top surface of wheel 51 and made to engage a plurality of circumferential recesses in flange 64. Shoulders 60 and 61 are held by housing 62 to prevent the rotation of tubular member 57. Another arrangement to prevent rotation of member 57 includes attachment of spring 67 to housing 62 and shoulder 66. Vapor inlet for the reactor is shown at 68. The embodiment shown is designed particularly for use with a bellows 69 for holding support 58 in sealed relationship with the inside wall of the contactor 10.

Figures 7, 8:
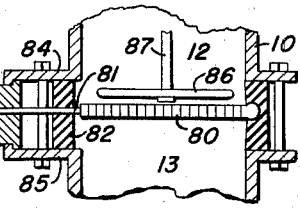
Figure 7 is a partial cross-section of a portion of the contacting zone showing the arrangement of horizontally vibrating support connected between stainless steel bellows or the equivalent.
Figure 8 is another partial cross-section of a portion of the contacting zone showing the arrangement of an impeller in conjunction with a resilient mounted horizontally vibrating support.

Figure 7 shows zones 12 and 13 of reactor 10 separated by a support 70 secured within member 71. Member 71 forms a portion of the reactor wall and is attached to rod 72 connected to a vibrating mechanism (not shown) adapted to give horizontal vibration of any desired magnitude to the support 70. A pair of bellows 73 and 74 connect to each end of member 71 and to the reactor body 10 and lower inlet zone 13. Bellows 73 and 74 may be made of stainless steel and welded or otherwise affixed to the reactor and member 71. Tie rods 75 and 76 attach between flanges 77 and 78 to support the apparatus.

In the arrangement shown in Figure 8 an oscillating support 80 is shown mounted similar to the embodiment of Figure 2, but with rod 81 attached through resilient member 82 from vibrator 83, which is affixed to flanges 84 and 85. Associated with the support 80 is impeller 86 on rotatable shaft 87. Impeller 86 may enter from below as shown in Figure 3.

In order to further demonstrate the invention, a series of experiments were conducted using a reactor or contactor embodying the simplest design of a cylindrical glass tube having an inside diameter of two inches and fitted at its bottom with a screen below a grid support and maintaining the catalyst within a confined zone. The reactor was partially filled with a fluidizable catalyst designated as Filtrol 58 and experiments conducted using no agitation for comparison with experiments using the different types of agitation found to maintain good fluidization under low flow velocities in accordance with the invention. As a preliminary to these investigations, it was established that with a reactor having a diameter of about two inches and a screen support and perforated grid at the bottom thereof, a superficial flow velocity of about 0.7 foot per second with no stirring, no vibration, or other source of agitation, there were attained good fluidized bed conditions with little or no tendency to form holes or geysers. In this same reactor, as the flow velocity was dropped from 0.5 foot per second to about 0.3 foot per second there was experienced a tendency to form incipient holes and geysers and some accumulations of static catalyst in the bottom of the bed. Further, as the velocity dropped to 0.20 foot per second, the bed became static in its lower portion and channelling started. This is shown by Experiments 8, 9, and 10 of the table. The balance of the experiments show that the application of agitation in accordance with the invention successfully overcomes the poor fluidization at low linear flow velocities.

*Fluidization experiments*

| Experiment Number | Type of Agitation | Rotameter Reading | Velocity, Ft./Sec. | Bed Depth, in. | | Expansion | | Observations |
|---|---|---|---|---|---|---|---|---|
| | | | | Settled | Expanded | In. | Percent | |
| 1 | None | 15 | 0.10 | 5⅜ | 6⅛ | ¾ | 14.0 | Poor fluidization; blow-holes. |
| 2 | Stirring, 57 R. P. M. (centripetal force) | 15 | 0.10 | 5⅜ | 8 | 2⅝ | 48.8 | Good fluidization. |
| 3 | None | 15 | 0.10 | 6 | 6⅝ | ⅝ | 11.6 | Poor fluidization; blow-holes. |
| 4 | Stirring, 57 R. P. M. (centrifugal force) | 15 | 0.10 | 6 | 7¾ | 1¾ | 29.2 | Bed static to 2¾″ above grid. Fluidization satisfactory above this level. |
| 5 | None | 15 | 0.10 | 6 | 6½ | ½ | 8.3 | Poor fluidization; blow-holes. |
| 6 | Vibration | 15 | 0.10 | 6 | 8¼ | 2¼ | 37.5 | Good fluidization. |
| 7 | Porous Stainless Steel Support | 15 | 0.10 | 6¼ | 10¼ | 4 | 64.0 | Do. |
| 8 | None | 57 | 0.40 | 6 | | | | Do. |
| 9 | do | 38 | 0.30 | 6 | | | | Static zone started to appear. |
| 10 | do | 20 | 0.20 | 6 | | | | Bed static to 2½″ above grid. Channelling started to appear. |

Referring to the fluidization experiments in the table, it is seen by comparison of Experiments 1, 3, and 5 with Experiment 2 that the application of stirring in the form of centripetal force through the use of an impeller designed to throw the catalyst particles toward the center of the reactor produced a considerable increase in the bed expansion and absence of blow-holes or geysers. Experiment 4 shows that changing from centripetal force to centrifugal force caused a drop in the bed expansion and the appearance of static zones within the fluidization bed. In Experiment 6 vibration was applied to the screen and grid support by the use of a Cleveland ⅜ vibrator rated at about 5200 cycles per minute, which again produced good fluidization and acceptable bed expansion. The substitution of a porous stainless steel support for the perforated grid in Experiment 7 likewise maintained good fluidization and produced remarkable bed expansion. The experiments show that the use of rotation, vibration, and intimate dispersion overcomes the tendency to inadequate fluidization at low superficial velocities.

In some instances, it may be to an advantage to use one or more of these mechanical expedients for agitation within the same reactor at the locus of the initial mixing of gases and contact material. The use of a vibrating porous steel plate, for example, has the advantage of giving uniform results and pronounced bed expansion over a stationary plate. Fluidization was also found to be improved as the diameter of the porous stainless steel plate approached tube diameter. Experiments not shown in the table disclose that in the extreme case where the porous stainless steel plate diameter equaled tube diameter good fluidization was obtained at 0.1 foot per second using air and Filtrol grade 36 natural cracking catalyst in the absence of mechanical agitation. However, this minimum requirement for good fluidization cannot be applied to a wide variety of low velocity reactions, and in most instances it is preferable to use more positive mechanical agitation to insure uniform fluidity throughout the reaction zone, the complete absence of large bubbles, and ease of catalyst circulation. For this purpose, the Micro Metallic grades E or F stainless steel plates may be used. Obviously, these plates can be employed only where the type of reaction conducted will not tend to plug the interstices of the plate and where the particle-form characteristics of the catalyst do not change. Furthermore, such plates cannot be used in contact with reactant mixtures which are corrosive, as, for example, in an atmosphere rich in hydrogen sulfide as might be used in the synthesis of methyl mercaptan from methyl alcohol.

The experiments in the table also demonstrate that it is essential to apply centripetal force to the inlet mixture of reactants and catalyst as opposed to centrifugal force in order to obtain the desired uniform fluidization. And, lastly, under certain specified conditions, the application of intimate dispersion through the use of a porous plate or sparger will obtain fluidization under low superficial velocities. This latter species of mechanical force, intimate dispersion, is confined to non-plugging and non-corrosive reactants under conditions such as to maintain the initial porosity of the dispersion means and under conditions of temperature, pressure, humidity, and velocity such that the fluidization properties of the catalyst remain substantially constant.

The types of catalyst or contact materials used in accordance with this invention comprise Davison microspherical synthetic and Filtrol grades 36 and 58 natural cracking catalysts and Alorco XF–21 alumina catalyst. In general, such materials are spheroidal in form, and susceptible to fluidization and promoting vapor phase reactions. Ground natural cracking catalysts are somewhat sharp edged when unused, but become rounded, i. e., approach sphericity, in use. Although the experiments are confined to the use of these finely divided catalysts of known good fluidization properties or to expensive microspherical (MS) catalysts, the invention is not to be confined to the type of contact material or catalyst used. The present method and apparatus design are applicable to any fluidizable contact material, whether catalytic or not. The degree of bed expansion noted in the experiments is only one measurement of the conditions of fluidization attained and is directly dependent upon the catalyst properties. With a ground catalyst, as, for example, the X466 Filtrol, bed expansions of 100 percent are attainable, but when using a microspherical catalyst only 20 percent bed expansion can be expected in some instances.

The degree of agitation, as measured by amplitude and frequency, necessary to obtain the desired fluidization, depends somewhat on the flow velocity used, the characteristics of the contact material, including in particular the particle size and shape, the reactor design, and the shape of the physical means used to impart the agitation to the environment above the contact material support means, whether the latter is a grid screen or other perforated supporting means. In general, the vibratory agitation may have an amplitude of from a few ten-thousandths of an inch to about one inch and a frequency of between about 60 to 10,000 cycles per minute. In the case of the application of centripetal force, the revolutions per minute utilized are dependent upon the design of impeller used. When using an impeller having a total impelling blade surface of 3.0 to 4.0 square centimeters, which is less than the cross-sectional area of the reactor tube, it was found that rotation at velocities varying from about 30 to 100 R. P. M. was adequate. There seems to be little relationship between the speed of rotation of the impeller and the flow velocity where the latter value is below 0.5 foot per second and, particularly, at about 0.3–0.05 foot per second or lower. In some instances, rotation of the impeller at below 30 revolutions per minute is adequate to maintain proper bed expansion and good fluidization within the reaction zone, especially under conditions of incipient hole formation or heaving. This is an important advantage of the present invention since it allows the use of low rates of vibration and rotation, thereby decreasing the wear on the equipment and the amount of power needed. Where dependence on visual observation of the condition of the fluidized zone is reasonable and some departure from the ideal is not detrimental, the agitation need not be continuous and may only be applied when necessary. Better operating technique would dictate, however, the use of continuous agitation at speeds of rotation or amplitudes and frequencies above the bare minimum.

Although the invention has been demonstrated by the use of contactors having diameters of less than 6 inches, the improved results may also be obtained when using contactors having diameters commonly used in commercial scale operations. Separate experiments conducted using the techniques so far described with a reactor in the order of 24 inches in diameter show that as the linear flow velocity drops below 0.5 foot per second considerable detrimental channelling, heaving, and hole formation accompanied by bed contraction, were experienced. The specified application of agitation at the locus of mixing in the form of stirring with centripetal force, vibration, or intimate dispersion was successful in maintaining good fluidization and eliminating the aforementioned difficulties.

The invention is applicable to many different types of reactions and may be demonstrated by the production of methanethiol. In conducting the synthesis of methanethiol from hydrogen sulfide and methanol, the procedure comprises passing suitable relative amounts of hydrogen sulfide and methyl alcohol at 100 to 150 p. s. i. g. and 700° to 800° F. through a bed of a suitable fluidized catalyst at about 0.4 pound methanol per hour per pound of catalyst. The catalyst may be vibrated or stirred at the catalyst support plate in accordance with this invention.

The apparatus may be equipped with suitable conduits for transferring catalyst and products after their separation in the separation zone for further use of the former after regeneration if necessary, and for purification or storage of the latter.

Many modifications of the invention will suggest themselves to those skilled in this art and these modifications will fall within the spirit of the invention as expressed in the claims.

What is claimed is:

1. An apparatus comprising, in combination, a vertical, elongated reaction chamber defined by a reactor wall housing a lower vapor inlet zone, an intermediate fluidized solids zone, and an upper vapor-solid separating zone, support means extending in resilient, sealed relationship transverse said chamber between said fluidized solids zone and said vapor inlet zone to support said solids and allow the passage of said vapors, a rotatable shaft extending through said support means and through a passageway in said housing in sealed relationship therewith, means attached to said shaft adjacent to and spaced from said support means to impart centripetal force to the solids thereon, a reciprocatable sleeve surrounding said shaft, said sleeve being attached to said support means and extending through said passageway in non-rotating, sealing relationship, means for rotating said shaft and means for reciprocating said sleeve whereby simultaneous vibration and centripetal force are applied to the locus of mixture of solids and vapor above said support means.

2. An apparatus comprising, in combination, a vertical, elongated reaction chamber having a lower vapor inlet zone, an intermediate fluidized solids zone, and an upper vapor-solid separating zone defined by a reactor wall, a porous support member extending in resilient sealed relationship transverse said reaction chamber between said vapor inlet zone and said intermediate fluidized solids zone, said porous support member having a cross-sectional area substantially equal to the cross-sectional area of said reaction chamber and being adapted to allow passage of vapors while preventing the passage of solids therethrough, a centrally located aperture within said porous support member, a passageway in said reactor wall communicating with said lower vapor inlet zone, a rotatable shaft resiliently mounted within said aperture and extending through said passageway, an impeller attached to one end of said shaft immediately above and spaced from said porous support member, a non-rotatable slidably mounted sleeve member surrounding said rotatable shaft, said sleeve member being attached to said porous support member, resilient sealing means between the outer wall of said sleeve and the inner wall of said reactor at the bottom of said vapor inlet zone, a pair of opposed spaced circumferential lips extending inwardly from said passageway communicating with said lower vapor inlet zone, a stop member on said sleeve, said lips being engageable with opposite ends of said stop member to define the sliding movement of said sleeve, a spring positioned between the reactor wall and a retaining flange on said sleeve, said spring tending to force said sleeve and attached porous support member away from said impeller, an outwardly-extending flange at the lower end of said sleeve, a wheel affixed to said shaft and spaced from said flange, at least one protuberance on said wheel, said protuberance registering with at least one recess on said flange, whereby rotation of said wheel causes the rotation of said shaft and impeller and the simultaneous vibration of said sleeve and porous support member through the repeated engagement of said protuberance with said recess.

References Cited in the file of this patent

UNITED STATES PATENTS

| | | |
|---|---|---|
| 2,404,944 | Brassert | July 30, 1946 |
| 2,577,856 | Nelson | Dec. 11, 1951 |
| 2,637,625 | Garbo | May 5, 1953 |
| 2,667,706 | Morse et al. | Feb. 2, 1954 |
| 2,740,698 | Helwig | Apr. 3, 1956 |